United States Patent
Cooley et al.

(10) Patent No.: US 7,895,204 B1
(45) Date of Patent: Feb. 22, 2011

(54) REDIRECTING FILE UPLOADS

(75) Inventors: Shaun Cooley, El Segundo, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 511 days.

(21) Appl. No.: 11/956,227

(22) Filed: Dec. 13, 2007

(51) Int. Cl.
*G06F 17/30* (2006.01)

(52) U.S. Cl. ........................ 707/736; 707/781

(58) Field of Classification Search ................. 707/736, 707/754, 781, 782, 999.01
See application file for complete search history.

(56) References Cited

U.S. PATENT DOCUMENTS

2004/0111727 A1* 6/2004 Schwarzbauer et al. ..... 719/310
2007/0233816 A1* 10/2007 Odenwald ................... 709/219
2007/0245882 A1* 10/2007 Odenwald ..................... 84/609
2009/0249945 A1* 10/2009 Yamashita et al. ............ 84/612

* cited by examiner

*Primary Examiner*—Angela M Lie
(74) *Attorney, Agent, or Firm*—Brill Law Office; Jeffrey Brill

(57) ABSTRACT

Outbound network traffic originating from a client is filtered, to check for files targeted for upload to remote sites. When a file targeted for upload to a remote site is detected, a remote storage location at which the client's backup data is stored is checked for a copy of the detected file. If a copy of the file is located at the remote backup site, that copy is substituted for the client copy in the network transmission to the target remote site. By uploading online copies of files when available, the client upload experience is much faster, and local bandwidth is preserved for other tasks.

12 Claims, 1 Drawing Sheet

REDIRECTING FILE UPLOADS

TECHNICAL FIELD

This invention pertains generally to managing electronic content online, and more specifically to allowing users to leverage online storage to reduce the time spent uploading files to external publication sites.

BACKGROUND

Today's internet users are likely to publish content on numerous websites. For example, a content producing internet user is likely to have photographs published on Flickr, MySpace and Facebook and video on YouTube, Google Video, College Humor and similar sites. Most users keep copies of this type of published content on their local computers.

The same internet users are likely to backup their local computers to an online backup site. When a user publishes content online and backs-up the same content to an online site, the user uploads the same media and document files twice, once to an online content sharing site (e.g., Flickr, MySpace, Facebook, YouTube, etc.) and once to the backup site. As media files can be very large, this duplicated uploading consumes a great deal of time and limited user bandwidth. The same problem occurs when users upload files to other types of online sites (e.g., ftp sites or mail servers) and separately backup the same files to an online backup site.

It would be desirable for users to be able to leverage online storage to avoid having to upload the same files to external sites more than once.

SUMMARY

Copies of user files backed-up to a remote storage location are automatically used to upload to publication sites, thereby saving the user the time and computer resources required to upload the same files to external sites multiple times. Outbound network traffic originating from a client is filtered, to check for files targeted for upload to remote sites. When a file targeted for upload to a remote site is detected, the client's online backup data is checked for a copy of the detected file. If a copy of the file is located at the online backup site, that copy is substituted for the client copy in the network transmission to the target remote site. By uploading online copies of files when available, the client upload experience is much faster, and local bandwidth is preserved for other tasks.

The features and advantages described in this summary and in the following detailed description are not all-inclusive, and particularly, many additional features and advantages will be apparent to one of ordinary skill in the relevant art in view of the drawings, specification, and claims hereof. Moreover; it should be noted that the language used in the specification has been principally selected for readability and instructional purposes, and may not have been selected to delineate or circumscribe the inventive subject matter, resort to the claims being necessary to determine such inventive subject matter.

Figure 1:
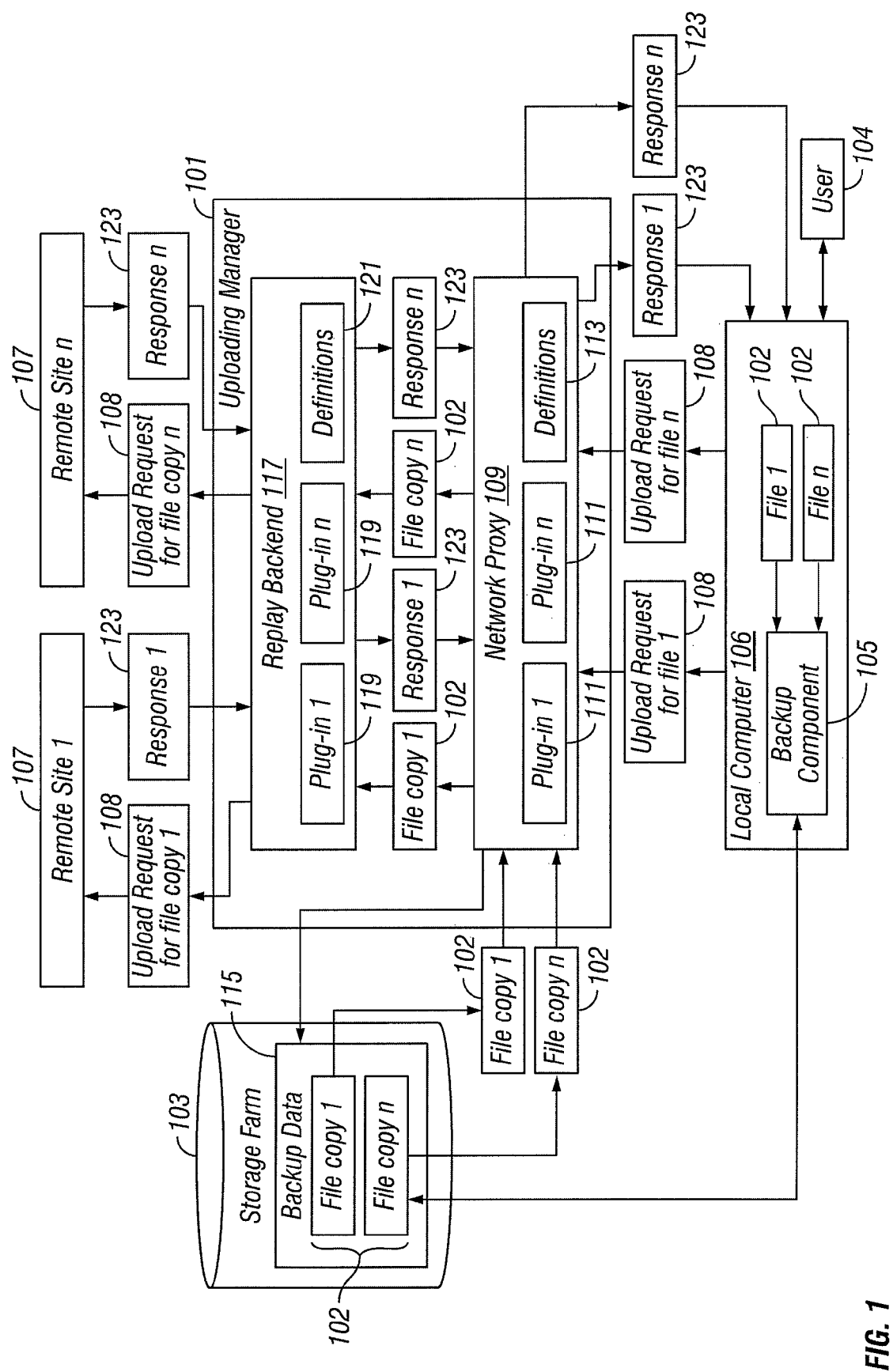
FIG. 1 is a block diagram illustrating a system for redirecting file uploads, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 in which an uploading manager 101 leverages online backup storage 103 to avoid having to repeatedly upload the same files 102 to external sites 107, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, all of a user's 104 local content 102 can be backed-up and stored externally, for example on a storage farm 103. The implementation mechanics of utilizing a server farm for storage purposes is known to those of ordinary skill in the relevant art, and the usage thereof within the context of the present invention will be readily apparent to one of such a skill level in light of this specification. Typically, a storage farm 103 comprises a plurality of servers and storage media, and utilizes a lot of redundancy.

A backup component 105 allows the backup of content 102 from the user's 104 local computer 106 to the storage farm 103. In some embodiments, the backup component 105 is in the form of an automated system backup solution that automatically finds all files 102 to be backed-up on the user's 104 computer 106 and uploads them to the storage farm 103. In other embodiments, the backup component 105 is instantiated as an XDrive style solution that allows the user 104 to manually copy files 102 to the storage farm 103. Various other methods and systems for backing up files 102 to an external site 103 are known to those of ordinary skill in the relevant art as well, and the usage mechanics of a wide variety of backup strategies within the context of the present invention will be readily apparent to one of such a skill level in light of this specification.

As illustrated, a network proxy 109 inspects all data leaving the user's 104 machine 106, in order to identify content 102 that the user 104 is posting to a remote site 107. As explained in greater detail below, the network proxy 109 redirects requests 108 to upload files 102 that already have been backed up to the storage farm 103, thereby eliminating duplicative uploading of content 102. The network proxy 109 can be implemented as a remote proxy as illustrated, or locally on the user's 104 computer 106. The network proxy component 109 can also be implemented as a plug-in to a local client application (e.g., web browser, email client, ftp client, etc.), such that the plug-in is capable of detecting and redirecting network traffic from the associated client application (e.g., Internet Explorer or FireFox). The network proxy 109 can be implemented to be user 104 configurable, or can be implemented so as to transparently filter network data transmission requests 108 originating from local user 104 computers 106. The implementation mechanics of the functionality of a network proxy 109 are known to those of ordinary skill in the relevant art, and their application within in the context of the present invention will be readily apparent to one of such a skill level in light of this specification.

The network proxy 109 can use protocol/site upload detection plug-ins 111 (described in greater detail below) or definitions 113 to search outbound network data for files 102 that are being posted or uploaded to a remote site 107. Once a file 102 upload request 108 is detected, the network proxy 109 determines if the detected file 102 has already been backed up to the storage farm 103. The proxy 109 can make this determination by examining the user's 104 remote backup data 115 on the storage farm 103, and looking for identifying information therein (e.g., filename, source path, content, and/or MD5 or similar hash of the content) that matches the detected outbound file 102. If a backed-up copy of the file 102 is not found, the original network traffic is allowed to pass through, unmodified. However, if a copy of the file 102 is already stored on the farm 103, the proxy 109 triggers a replay backend component 117 to replay the user's 102 upload request 108, from the storage farm 103, thus providing much faster throughput in posting to the content site 107. The workings of the replay backend 117 are described in detail below.

As noted above, in some embodiments of the present invention, the network proxy 109 utilizes one or more protocol/site upload detection plug-ins 111 and/or definition files 113. These components provide the network proxy 109 with an extensible framework for extending support to new protocols or websites. In the case of plug-ins 113, each plug-in 113 is responsible for translating protocol specific tasks (detection, capture, etc.) to a normalized interface for use by the network proxy 109. In the case of definition files 113, each definition file 113 contains sufficient details to provide the network proxy 109 with instructions for handling a particular protocol or website. The functionality and/or content provided by these plug-ins 111 and/or definition files 113 can also be built directly into the network proxy 109.

Returning now to the replay backend 117, once the replay backend 117 finishes uploading a file 102 from the storage farm 103 to a publication site 107, the replay backend 117 transmits the response 123 from the site 107 to the network proxy 109, which in turn returns an appropriate response 123 to the requesting application on the user's 104 local computer 106. From the point of view of the requesting application, the process occurs just as if the entire request 108 had been made from the client 106, and the response 123 had been transmitted to the client 106 directly from the content site 107.

Thus, the network replay backend 117 is responsible for replaying user 104 generated network requests 125, such that files 102 already backed up to the storage farm 103 are substituted for files 102 from the user's 104 computer 106. The network replay backend 117 can use one or more protocol/site upload replay plug-ins 119 or definition files 121 in the execution of its functionality. Each plug-in 119 is responsible for translating protocol specific tasks (build/modify packet, send packet, receive response, etc.) to a normalized interface for use by the network replay backend 117. Each definition 121 file contains sufficient details to provide the network replay backend 117 with instructions for modifying and replaying network communications. As with the network proxy 109, functionality and or content provided by these plug-ins 119 and/or definition files 121 can also be built directly into the network replay backend 117.

It is important to note that the specific flow of data between the replay backend 117 and the user's 104 computer 106 can vary, depending upon the particular specifications of the individual protocol or site that is being proxied and replayed. For example, in an HTTP upload, it may be desirable to trickle progress back to the web browser to give the appearance that the upload is progressing. Similarly, in an AJAX based HTTP upload, the JavaScript that is uploading content may utilize the same response trickle to show real-time upload speed and progress. In addition, in some embodiments the user can be provided with an email, SMS, or similar notification upon completion of an upload.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

The invention claimed is:

1. A computer implemented method for redirecting file uploads, the method comprising the steps of:
   filtering outbound network traffic originating from a client, further comprising filtering at least one client request to upload at least one file to at least one remote site;
   detecting at least one file targeted for upload to a remote site in the filtered outbound network traffic;
   checking a remote storage location associated with the client for a copy of at least one detected file;
   responsive to locating a remotely stored copy of at least one detected file, substituting the remotely stored copy for that detected file in a network transmission to the target remote site; and
   returning at least one response to at least one filtered client request to upload at least one file to at least one remote site client, further comprising returning a response received in reply to a replayed filtered request to upload a file to a remote site from the remote storage location.

2. The method of claim 1 wherein substituting a remotely stored copy for a detected file further comprises:
   replaying a filtered request to upload a file to a remote site from the remote storage location.

3. The method of claim 1 wherein checking the remote storage location associated with the client for a copy of at least one detected file further comprises performing at least one step from a group of steps consisting of:
- checking filenames of remotely stored files for a filename of at least one detected file;
- checking source paths of remotely stored files for a source path of at least one detected file;
- comparing a hash of at least one remotely stored file to a hash of at least one detected file; and
- comparing content of at least one remotely stored file to content of at least one detected file.

4. The method of claim 1 further comprising:
maintaining a storage farm comprising stored content associated with at least the client.

5. At least one non-transitory computer readable medium containing a computer program product for redirecting file uploads, the computer program product comprising:
- program code for filtering outbound network traffic originating from a client, further comprising filtering at least one client request to upload at least one file to at least one remote site;
- program code for detecting at least one file targeted for upload to a remote site in the filtered outbound network traffic;
- program code for checking a remote storage location associated with the client for a copy of at least one detected file;
- program code for, responsive to locating a remotely stored copy of at least one detected file, substituting the remotely stored copy for that detected file in a network transmission to the target remote site and program code for returning at least one response to at least one filtered client request to upload at least one file to at least one remote site client, further comprising returning a response received in reply to a replayed filtered request to upload a file to a remote site from the remote storage location.

6. The computer program product of claim 5 wherein the program code for substituting a remotely stored copy for a detected file further comprises:
- program code for replaying a filtered request to upload a file to a remote site from the remote storage location.

7. The computer program product of claim 5 wherein the program code for checking the remote storage location associated with the client for a copy of at least one detected file further comprises program code for performing at least one step from a group of steps consisting of:
- checking filenames of remotely stored files for a filename of at least one detected file;
- checking source paths of remotely stored files for a source path of at least one detected file;
- comparing a hash of at least one remotely stored file to a hash of at least one detected file; and
- comparing content of at least one remotely stored file to content of at least one detected file.

8. The computer program product of claim 5 further comprising:
program code for maintaining a storage farm comprising stored content associated with at least the client.

9. A computer system for redirecting file uploads, the computer system comprising:
- a hardware portion for filtering outbound network traffic originating from a client further comprising filtering at least one client request to upload at least one file to at least one remote site;
- a hardware portion for detecting at least one file targeted for upload to a remote site in the filtered outbound network traffic;
- a hardware portion for checking a remote storage location associated with the client for a copy of at least one detected file;
- a hardware portion for, responsive to locating a remotely stored copy of at least one detected file, substituting the remotely stored copy for that detected file in a network transmission to the target remote site; and
- a hardware portion for returning at least one response to at least one filtered client request to upload at least one file to at least one remote site client, further comprising returning a response received in reply to a replayed filtered request to upload a file to a remote site from the remote storage location.

10. The computer system of claim 9 wherein the hardware portion for substituting a remotely stored copy for a detected file further comprise:
a hardware portion for replaying a filtered request to upload a file to a remote site from the remote storage location.

11. The computer system of claim 9 wherein the hardware portion for checking the remote storage location associated with the client for a copy of at least one detected file further comprise a hardware portion for performing at least one step from a group of steps consisting of:
- checking filenames of remotely stored files for a filename of at least one detected file;
- checking source paths of remotely stored files for a source path of at least one detected file;
- comparing a hash of at least one remotely stored file to a hash of at least one detected file; and
- comparing content of at least one remotely stored file to content of at least one detected file.

12. The computer system of claim 9 further comprising:
a hardware portion for maintaining a storage farm comprising stored content associated with at least the client.

* * * * *